United States Patent [19]

Matson

[11] 3,866,716

[45] Feb. 18, 1975

[54] ROTARY ROLLER LUBRICANT ACCUMULATOR

[76] Inventor: Carl G. Matson, 410 E. Central Blvd., Kewanee, Ill. 61345

[22] Filed: Jan. 14, 1974

[21] Appl. No.: 433,098

[52] U.S. Cl. ............... 184/14, 29/116 R, 112/256, 193/37, 308/20, 184/101
[51] Int. Cl. ............... F01m 1/00, F16n 1/00
[58] Field of Search ............ 184/14, 105 R, 101, 18, 184/26, 54, 23; 308/20; 193/37; 29/110, 113 R, 113 AD, 116 R, 116 AD; 112/256

[56] References Cited
UNITED STATES PATENTS

| 776,000 | 11/1904 | Turner | 29/113 R |
|---|---|---|---|
| 942,728 | 12/1909 | Jones | 193/37 UX |
| 1,365,606 | 1/1921 | Seymour-Jones | 29/113 R |
| 1,373,026 | 3/1921 | Scott | 184/14 UX |
| 1,742,453 | 1/1930 | Van Derhoef | 193/37 |
| 3,457,617 | 7/1969 | Noe et al. | 29/113 R |
| 3,818,831 | 6/1974 | Schultz | 29/116 R X |

FOREIGN PATENTS OR APPLICATIONS

| 27,090 | 6/1954 | Finland | 29/113 R |
|---|---|---|---|
| 735,959 | 6/1943 | Germany | 29/116 R |
| 23,603 | 8/1962 | Germany | 184/14 |
| 500,594 | 2/1939 | Great Britain | 184/101 |
| 649,687 | 1/1951 | Great Britain | 308/20 |

Primary Examiner—Richard C. Pinkham
Assistant Examiner—Arnold W. Kramer

[57] ABSTRACT

A lubricant accumulator for use within the hollow interior of a roller or the like mounted on a shaft for relative rotation, wherein the shaft has an axial lubricant supply passage opening to the interior of the roller intermediate a pair of sealed bearings for supplying lubricant under pressure to the annular space provided between the interior of the roller and the outer surface of the shaft. The accumulator is constructed of resilient, sponge-like material that yields radially away from the shaft under pressure of the lubricant and that recovers its unloaded state to force lubricant back toward and through the bearings to make up for lubricant lost outwardly through the bearings and seals.

17 Claims, 7 Drawing Figures

PATENTED FEB 18 1975  3,866,716
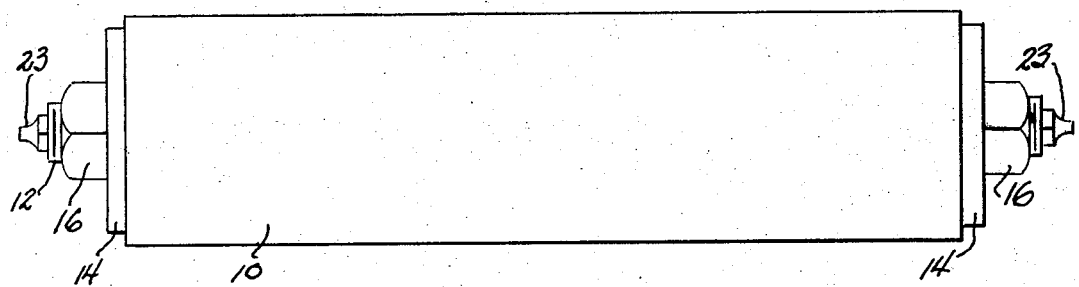
Fig.1.
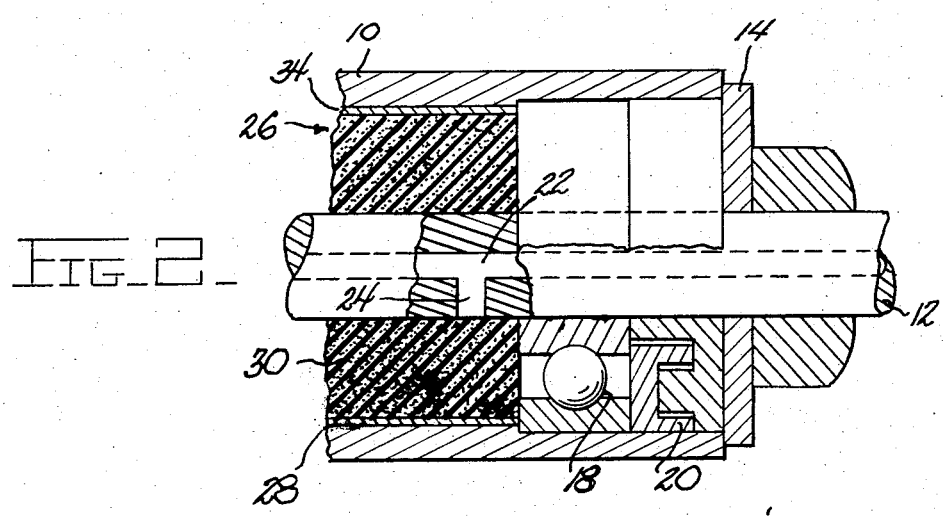
Fig.2.
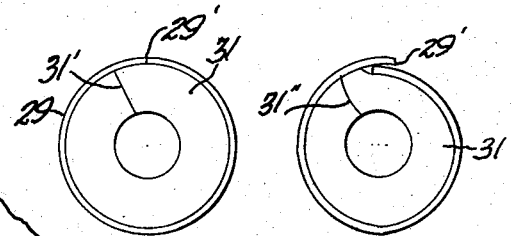
Fig.6. Fig.7.
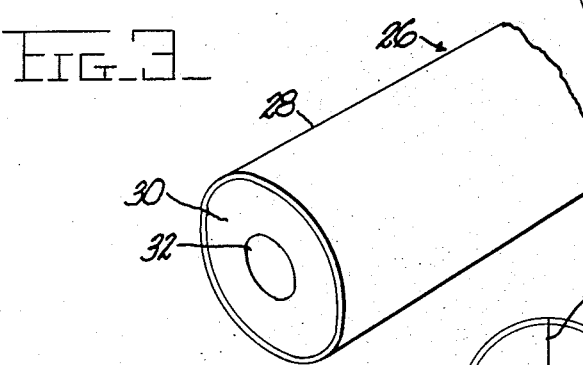
Fig.3.
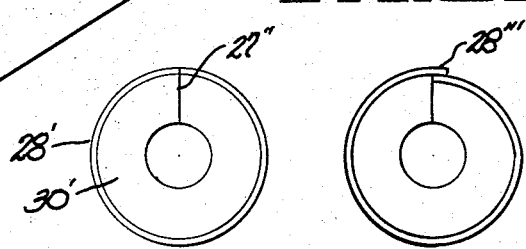
Fig.5.
Fig.4.

ROTARY ROLLER LUBRICANT ACCUMULATOR

BACKGROUND OF THE INVENTION

It is commonplace in the art of conveyors to provide belt-supporting rollers journaled on shafts and to provide the shafts with drilled axial and radial passages through which lubricant may be introduced to the interior of the rollers to insure a supply of lubricant for the bearings. In many areas, as in materials handling, the rollers are exposed to the weather, abrasive materials and the like and constant attention must be paid to the task of lubricating the rollers so as to avoid premature wear of the bearings and seals. In the cases of larger conveyor structures, proper lubrication requires that a mechanic walk along the conveyors, often on a scaffolding, to manually supply lubricant under pressure at rather frequent intervals to the lubricant fittings at the roller shaft ends. This involves considerable time, effort and labor, and very often the lubrication task becomes haphazard and in some cases dangerous, with the end result that bearings and seals wear our prematurely.

SUMMARY OF THE INVENTION

According to the present invention, the hollow interior of each roller is fitted with an accumulator which yields to the pressurized lubricant introduced and thus provides a storage of lubricant under pressure which constantly supplies a reverse flow of lubricant to the bearings and at the same time flows past the seals to flush the seals of foreign materials. At this point it should be understood that the pressure developed by the accumulator as it recovers its natural state after being compressed by lubricant supplied through the usual one-way lubricant fittings is much lower than that created as the lubricant is introduced. Stated otherwise, the material of which the accumulator is basically composed may be compressed to a substantial portion of its free volume and this material is selected on the basis of a recovery capacity so that it exerts a constant low pressure on the stored lubricant.

The underlying feature of the invention is the provision of an accumulator unit that may be easily installed in existing rotary structures so as to fill the ordinarily existing annular space between the roller and the shaft and defined at its ends by the bearings. The unit has a tubular, relatively rigid outer structure and a core of resilient, sponge-like material having a central opening that closely fits the shaft. The exterior of the tubular shell closely fits the interior of the roller and the core is bonded or otherwise adhered to the shell so that lubricant under pressure flows along the shaft and between the shaft and core so as to compress the core radially. The relative sizes are selected according to roller and shaft diameters so that very little if any lubricant is wasted between the shell and roller. Another feature is that the accumulator may be provided in modified form, or adapted to such form, wherein the outer covering is slit lengthwise, as is the core. This permits the accumulator to assume a smaller diameter, within limits, to enable one accumulator to fit a relatively wide range of sizes.

DESCRIPTION OF THE DRAWINGS

FIG. 1 is an elevation of a typical roller as used in conventional belt conveyors.

FIG. 2 is an enlarged, fragmentary sectional view of one end of the structure in FIG. 1 as equipped with one form of accumulator according to the invention.

FIG. 3 is a reduced, fragmentary perspective of the accumulator per se.

FIG. 4 is an end view of the modified form of accumulator (or accumulator as adapted to this form) in which the shell and core are slit lengthwise.

FIg. 5 is a similar view but showing the accumulator "squeezed" down to fit an inside diameter somewhat less than the full diameter of the accumulator.

FIG. 6 is an end view of a modified form of accumulator as in FIG. 4 with the shell and core slits angularly offset from each other.

FIG. 7 shows the modified accumulator of FIG. 6 "squeezed" down to fit an inside diameter somewhat less than the full diameter of the accumulator.

DESCRIPTION OF A PREFERRED EMBODIMENT

According to standard construction, a cylindrical hollow member or roller 10 is journaled on a fixed shaft 12 that is supported adjacent to opposite ends by supports 14 and secured by nuts 16. As best seen in FIG. 2, the roller and shaft are inter-journaled by coaxially spaced apart anti-friction bearings 18 (only one bearing being shown but the presence of two being obvious). Each bearing is sealed by a typical seal 20, here of the labyrinth type, but the nature of the seal is immaterial to an understanding of the present invention. Each seal is, of course, axially outwardly of its bearing.

The shaft, as shown here, has an axial passage means 22 opening, preferably, at opposite ends of the shaft —depending upon the length of the shaft—and is internally threaded to receive conventional one-way lubricant or grease fittings 23 through which grease is supplied to the passage by the usual grease gun or its equivalent. Intermediate the bearings 20 the passage opens via at least one radial passage portion 24 to the normally existing annular space defined annularly by the exterior surface of the shaft and the interior cylindrical surface of the roller 10 and defined axially by the inner radial faces of the race rings of the bearings 18. Conventionally, grease supplied through the passage portions 22 and 24 would enter this annular space but experience has shown that the grease thus "stored" is of little practicable use.

The above structure represents one form of known roller-shaft structure. Another form would include seals axially inwardly of the bearings and in those cases the supply passage would be designed to lead to the bearings per se. In the use of the accumulator according to the present invention, no modifications would be required in the first-described structure, but in the second the inner seals would have to be removed and perhaps some shaft modifications made, because the beneficial characteristics of the inventive accumulator depend upon use of the accumulator in the annular space within the roller as previously defined.

The accumulator is shown by itself in FIG. 3 and is designated in its entirety by the numeral 26 and, as seen, is cylindrical. It comprises a tubular outer shell 28 of relatively rigid material that is grease proof, preferably any known paper or like produce having that characteristic so as to enable it to be easily handled, stored shipped, etc. Within the shell 28 and substantially coextensive in length therewith is a core 30 having a coaxial end-to-end cylindrical opening 32. The dimensions of the accumulator will, of course, be selected according to the dimensions of the annular space within the roller-shaft structure. For example, the axial length of the accumulator will be according to the axial distance between the bearings 18; the outside diameter of the accumulator will depend on the inside diameter of the interior surface of the roller 10; and the diameter of the opening 32 will depend upon the diameter of the shaft 12. These dimensions are selected on the basis of a tolerable but relatively close fit, especially at the circumferential area 34 between the exterior of the accumulator shell 28 and the interior of the roller 10, so as to minimize the waste of grease. The size of the opening 32 is such that it enables the flow of grease between the exterior of the shaft and the core.

The core 30 is composed of resilient, sponge-like material that is capable of being radially compressed by lubricant flowing between the shaft 12 and the interior of the opening 32, so that the forces exerted are such as to reduce the volume of the core toward the shell 28. To prevent axial displacement of the core relative to the shell, the core and shell are bonded or otherwise adhered to each other so that there is no axial creep of the core relative to either the shaft or shell. In a preferred construction, poly-urethene has been found to be an excellent material, because it is essentially grease-proof, readily available, has a substantially long retention life and is specifically compressible to produce one pound per square inch of pressure. Another characteristic of this material is that it is of closed-cell construction having capacity for lubricant up to three-fourths of its free volume. Thus any suitable cellular elastomer or plastic material approaching desirable criteria will satisfy as material for the core.

As already stated, conventional roller-shaft structures or their equivalents lend themselves to exploitation of the advantages of the accumulator 26. Grease supplied under pressure via 23-24-22 flows along the interface between the exterior of the shaft 12 and interior of the core 30, compressing the core radially to the extend indicated above. Also as stated above, the recovery pressure exerted by the core is quite a bit lower than the pressure exerted by the lubricant supply means; that is to say, the "path of least resistance" leads to radial compression of the core rather than to escape through the bearings and seals.

During continued operation or rotation of the roller, normal wear and tear on the seals will result in both loss of lubricant and entry of foreign material. As the core recovers its unloaded state, it forces the stored lubricant back along the shaft both through the radial passage 24 and past this passage to the bearings 18 and through the bearings and seals 20 to add grease to the bearings and to flush out the bearings and seals so that foreign materials that may have entered are ejected. The improved results obtained through use of the accumulator include extremely fewer occasions when lubrication is needed and prolongation of bearing and seal life from days to months. The accumulator per se may be easily produced, stored, shipped and installed and in very few instances will modification of existing structures be required.

The accumulator shown in FIGS. 4 and 5 includes an outer shell 28' and core 30' like the accumulator previously described, except that the core and shell are slit lengthwise from end to end as shown at 27". Let it be assumed that the O.D. of this particular accumulator is 1¾ inch but that the I.D. it must fit is, say, 1½ inch. In this case, the accumulator may be "squeezed" down according to FIG. 5 so that the normally abutting shell edges along the slit 27" slip past each other and overlap as at 28"'. The foam of the core is easily deformed, and grease under pressure simply acts as before—compresses the foam radially— and there are no harmful effects. The type of adhesive used may be such that the interior of the shell is rendered pressure sensitive, so that when the shell is "deformed" (FIG. 5), the foam may become separated from the shell so as to "slide" to the left as seen in FIG. 5.

In the further modified form as seen in FIGS. 6 and 7, the shell and core slits may be angularly offset initially, as at 29' in the shell 29 and 31' in the core 31. This construction can prove to provide a "seal" against the escape of lubricant to flow between the shell and core in either the "natural" or deformed conditions of the accumulator, and in the latter status the core "shifts" or "slides" to left, or counterclockwise as seen at 31" in FIG. 7.

I claim:

1. A rotary roller lubricant accumulator structure including a cylindrical shaft, a cylindrical member having a hollow cylindrical interior loosely concentric with the shaft and providing, with the shaft and the interior of the member, a cylindrical annular space, a pair of coaxially spaced apart anti-friction bearings inter-journalling the shaft and member, a pair of lubricant seals respectively axially outwardly of the bearings, said shaft having an axial passage opening radially to said space intermediate the bearings and opening at at least one end of the shaft for accommodating the supply of lubricant under pressure to said space, and lubricant accumulator means in said space, characterized in that said means includes a cylindrical tubular shell relatively closely surrounded by the interior surface of the member and extending substantially from one bearing to the other, and a cylindrical core within and substantially coextensive in length with the shell and having an axial opening relatively closely surrounding the shaft, said core being of resilient, sponge-like material capable of radial deformation under pressure of lubricant forced between the shaft and core via the supply passage and also capable of recovering its pre-deformed state so as to pressurize the lubricant axially toward the bearings.

2. The invention defined in claim 1, further characterized in that the shell is constructed of relatively more rigid material than the core.

3. The invention defined in claim 2, further characterized in that the shell material is a substantially grease-proof paper product.

4. The invention defined in claim 1, further characterized in that the core material is an elastomer.

5. The invention defined in claim 4, in which the elastomer is polyurethane rubber.

6. The invention defined in claim 1, further characterized in that the outer surface of the core is adhered to the interior surface of the shell.

7. The invention defined in claim 1, further characterized in that the shell is constructed of a substantially grease-proof paper product and the core is of polyurethane rubber.

8. The invention defined in claim 7, further characterized in that the outer surface of the core is adhered to the interior surface of the shell.

9. The invention defined in claim 1, in which the shell is slit lengthwise from end to end so that the abutting edges bordering the slit may be overlapped to enable limited squeezing of the shell to a smaller outside diameter.

10. The invention defined in claim 9, in which the core is likewise slit lengthwise from end to end.

11. The invention defined in claim 9, in which the core is also slit lengthwise from end to end and the core and shell slits are coextensive and in radial alinement.

12. The invention defined in claim 9, in which the core is also slit lengthwise from end to end and the core and shell slits are angularly offset.

13. The invention defined in claim 1, in which the core is adhered to the interior of the shell by an adhesive that renders the shell interior pressure sensitive.

14. The invention defined in claim 13, in which the shell is slit lengthwise from end to end so that abutting edges bordering the slit may be overlapped to enable limited squeezing of the shell to a smaller diameter and the portion of the core adjacent to the overlap is capable of separating from the corresponding portion of the shell so as to accommodate the reduction in diameter.

15. The invention defined in claim 14, in which the core is also slit lengthwise from end to end.

16. The invention defined in claim 15, in which the shell and core slits are radially alined.

17. The invention defined in claim 15, in which the core and shell slits are angularly offset.

* * * * *